United States Patent [19]
Wada

[11] Patent Number: 4,682,955
[45] Date of Patent: Jul. 28, 1987

[54] EDUCATIONAL TOY

[76] Inventor: Yoshiomi Wada, 3-53-10, Higashi Oizumi-machi, Nerima-ku, Tokyo, Japan

[21] Appl. No.: 791,783

[22] Filed: Oct. 28, 1985

[30] Foreign Application Priority Data

Oct. 31, 1984 [JP] Japan ................................. 59-227642

[51] Int. Cl.⁴ ........................ G09B 1/14; G09B 19/02
[52] U.S. Cl. .................................... 434/191; 434/175
[58] Field of Search ................................ 434/191, 175

[56] References Cited

U.S. PATENT DOCUMENTS 1,218,993  3/1917  Fox ........................................ 434/175
1,240,556  9/1917  Fox ........................................ 434/175
2,917,325  12/1959  Sines ................................. 434/365 X

FOREIGN PATENT DOCUMENTS 1074815  7/1967  United Kingdom ................ 434/191

Primary Examiner—William H. Grieb
Attorney, Agent, or Firm—Mason, Kolehmainen, Rathburn & Wyss

[57] ABSTRACT

An educational toy comprises a body having a peripheral vertical wall, a guide plate secured on the body and having a plurality of radial cutouts to be passages, a connecting passage formed between the vertical wall and the guide plate to communicate with the cutouts, and a plurality of slider pieces which may be moved along the radial cutouts and the connecting passage. The slider pieces are put in different colors to enjoy learning simple calculation. The toy is applicable to a picture book with some character and sentences.

9 Claims, 8 Drawing Figures

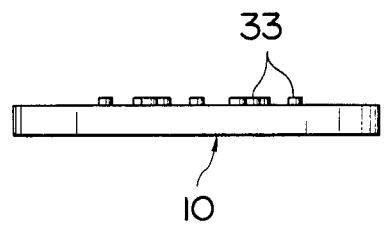
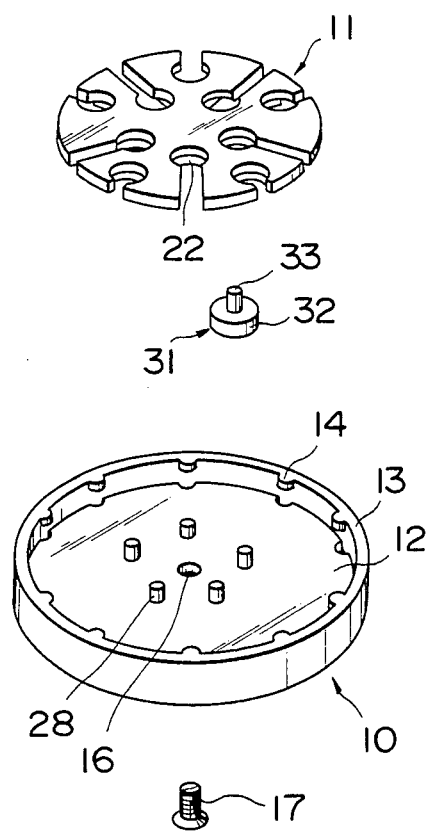

EDUCATIONAL TOY

FIELD OF THE INVENTION

The pressent invention relates to an educational toy, in particular to an educational toy which is suitable for enhancement of children's ability in calculation.

BACKGROUND OF THE INVENTION

Children usually play with many toys of different types and learn to count or calculate various things by use of a numerary toy provided with countable members. In this respect, it is practically desirable to make children naturally learn numerical concept and to promote their ability in arithmetic calculation by using a suitable educational toy. However, toys of conventionally used abacus type are inconvenient for little children because it is rather difficult and boring for them to understand and utilize it well. Moreover, as these toys commonly include a plurality of separate blocks, some of them are prone to be lost during playing, and therefore, the toys are inconvenient for little children to joyfully play with them for a long period of time. On the other hand, it would be very difficult to incorparate prior art calculating toys in a picture book due to their bulkiness.

A principal object of the present invention is to provide an educational toy which is suitable for enhancement of children's ablility in calculation. Another object of the invention is to provide an educational toy of small size for easy handling by little children without detachment and loss of countable members. Still another object of the invention is to provide an educational toy capable of making children pleasantly learn calculation and names of colour. Still further object of the invention is to provide a small-sized and flat toy which is conveniently incorporated in a picture book for children.

SUMMARY OF THE INVENTION

For this end, the toy in accordance with the present invention includes a plurality of slider blocks or pieces which are slidably moved on the flat toy by a child's finger for calculation without detachment. The slider pieces are put in different colours of different number. The toy comprises a body having a peripheral vertical wall, a guide plate attached on the body and provided with a plurality of inwardly extending cutouts to be passages, a spacer disposed between the body and the guide plate, a connecting passage formed between the outer edge of the guide plate and the vertical wall of the body for communicating with the cutouts, and a plurality of slider pieces movable along the cutouts and along the connecting passage. The slider pieces have different colours, for example, four colours with the different number. Firstly, children can learn names of colour, and then enjoy calculation by movement of the differently coloured pieces by a finger along the cutouts and connecting passage. The toy may easily be incorporated in a picture book by rigidly securing the bottom surface of the body on an inside surface of a back cover of the book. In this case, the toy is positioned within openings formed in leafs of the book showing some character or sentences.

DETAILED DESCRIPTION OF THE INVENTION

These objects and advantages of the present invention will be apparent from the following description in connection with preferred embodiments shown in the accompanying drawings wherein:

FIG. 3 is a side elevational view of FIG. 1;

FIG. 4 is an exploded perspective view of the toy in FIG. 1;

Figure 1:
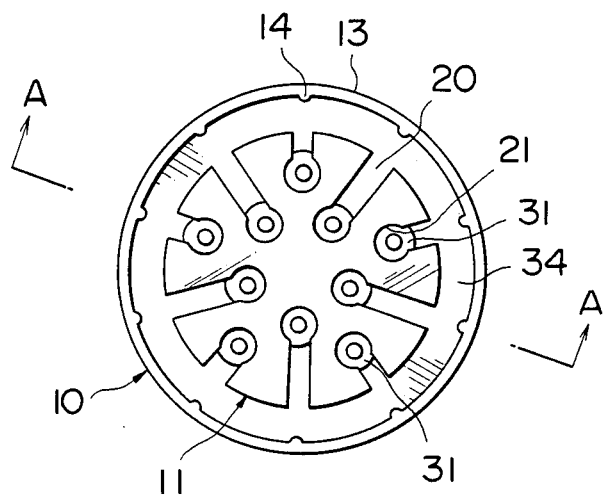
FIG. 1 is a top view of a toy in accordance with the present invention.
Figure 2:
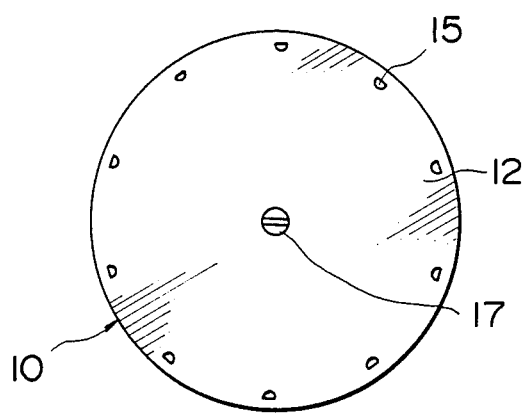
FIG. 2 is a backview of FIG. 1.

Now referring to FIGS. 1 to 4, the toy of the present invention comprises a circular body 10 and a guide plate 11 attached thereon. The body 10 includes a circular base 12 and a vertical annular wall 13 extending upwardly on the periphery of base 12. The vertical wall 13 is provided with a plurality of semicircular lugs 14 (ten shown in FIG. 1) radially inwardly protruding from the vertical wall 13 in angularly space positions. To form these lugs 14 integrally with the vertical wall by plastic molding, semicircular holes 15 are formed in the corresponding positions of the base under lugs 14 so that a parting portion of a die may be removed through holes 15 upon molding. The body 11 includes a central hole 16 (FIG. 4) through which a fixing screw 17 is inserted for assembling the toy. A plurality of pins 28 may preferably be formed on the base 12 in angularly spaced relation to prevent rotation of the guide plate 11 after assembling.

The guide plate 11 is secured to the body by screw 17 which passes through hole 16 and is in screwed connection to an aperture 23. As shown in an enlarged scale in FIG. 5 (bottom view), the guide plate 11 is provided with a plurality of radially and inwardly extending cutouts 20 (ten shown in the drawings) all toward the same central point of the guide plate to provide alternate long and short passages 20a and 20b. A circular opening 21 is formed at the inner end of each passage 20a and 20b. These cutouts may be of the same length or of various configurations as desired. In any case, the lugs 14 are formed on the vertical peripheral wall 13 in alignment with the central line of these coutouts 20 as shown in FIG. 1.

Figure 5:
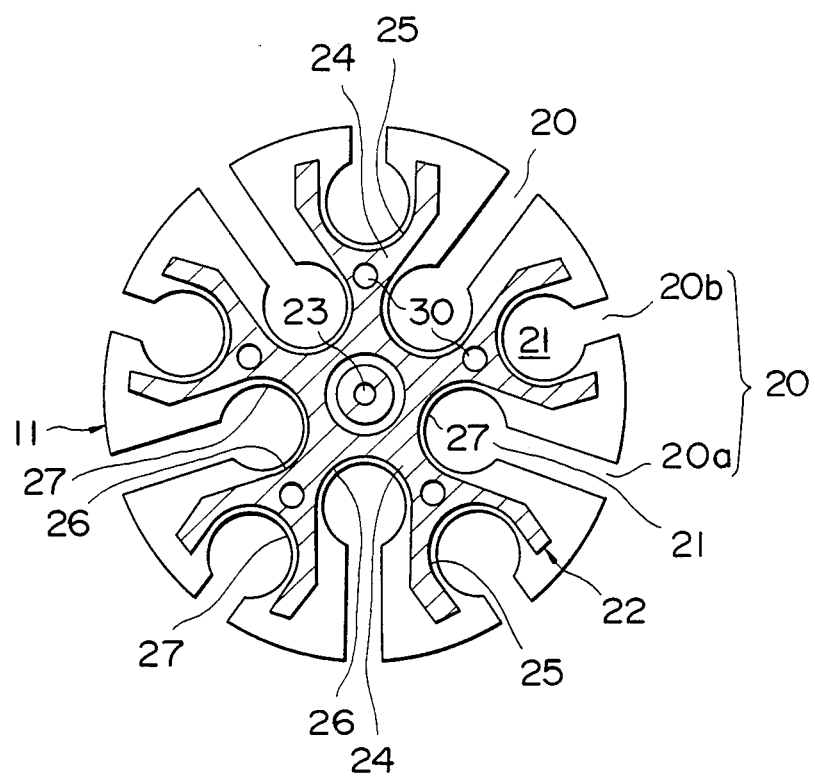
FIG. 5 is an enlarged back view of a guide plate.
Figure 6:
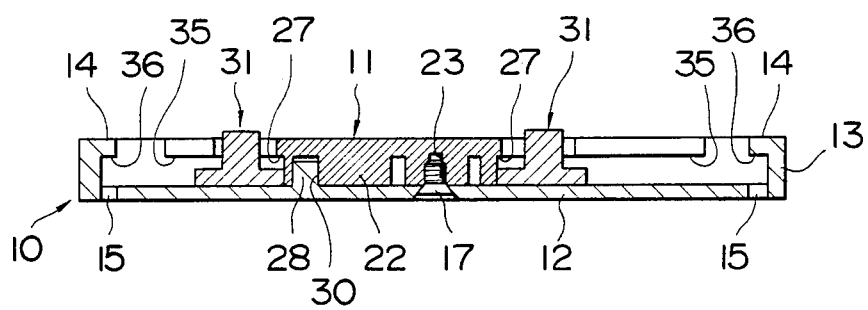
FIG. 6 is a sectional view taken along a line A—A in FIG. 1.
Figure 7:
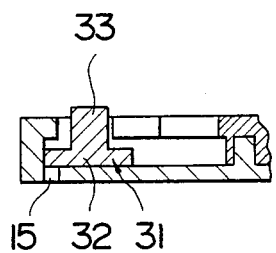
FIG. 7 is a partial section showing a slider piece.

Then, referring to FIG. 5 depicting the back view of the guide plate 11, a spacer 22 (shown in hatching) is disposed between the base 12 of the body 10 and the guide plate 11 which is formed as an integral part with the spacer 22 in this embodiment. Otherwise, the spacer 22 may be an independent unit or an integral part of the body 10. The spacer 22 has five radial arms 24 each comprising a forked portion 25 around which the opening 21 is formed at the inner end of each short passage 20b. Circular recesses 26 are formed between adjacent arms 24 and around the openings 21 connected to the long passages 20a. Both diameters of the forked portions 25 and the recesses 26 are slightly larger than those of openings 21 to provide shoulders 27 between openings 21 and the forked portions 25 or recesses 26 as shown in FIGS. 5 and 6. Five holes 30 shown in FIG. 5 are perforated in an intermediate portion of each arm 24 to receive pins 28 of the body 10 upon assembling in order to surely prevent relative rotation of the guide plate 11 with respect to the body 10. The outer diameter of the guide plate is suitably smaller than the inner diameter of the vertical wall 13 to form a connecting annular passage 34 between the guide plate 11 and vertical wall 13 so that the annular passage 34 communicates the long and short passages 20a and 20b.

A plurality of slider pieces 31 are slidably disposed between the guide plate 11 and the body 10 to move them through the annular passage 34 and the radial passages 20a and 20b. As shown in FIG. 4, each slider pieces 31 comprises a base disk 32 and a central protrusion 33 extending upwardly from the disk 32 which has larger diameter than that of protrusion 33. The base disks are disposed within the passages 20a, 20b or 34 so that the upper surface of each base disk faces the underside of guide plate 11. The protrusion 33 extends above the upper surface of guide plate 11 for touch by a child's finger. In moving slider pieces 31 through these passages, they can not be separated from the body after assembling, because, when the piece is lifted, the upper surface of the base disk 32 always contacts with the shoulder 27 of the guide plate 11 or with underside 36 of lug 14.

As each protrusion 33 of slider pieces 31 has the length enough to touch and push it by a finger on the upper surface of the guide plate 11, the piece may easily be moved along the passages 20a, 20b and 34. These slider pieces may be of the same number as that of the radial cutouts 20 (ten in this embodiment) and disposed in desired openings 21. These pieces may be coloured, for instance, one in yellow, two in blue, three in green and the remaining four in red.

In usage, some slider pieces 31 are moved out of the openings 21 to the circular passage 34, counting them for simple arithmetic calculation. For instance, a child is taught that one yellow plus two blues equal 3 or three greens plus four reds equal 7 with these pieces moved. Similarly, subtraction may be shown to a child returning the pieces from the passage 34 to the cutouts 20.

Figure 8:
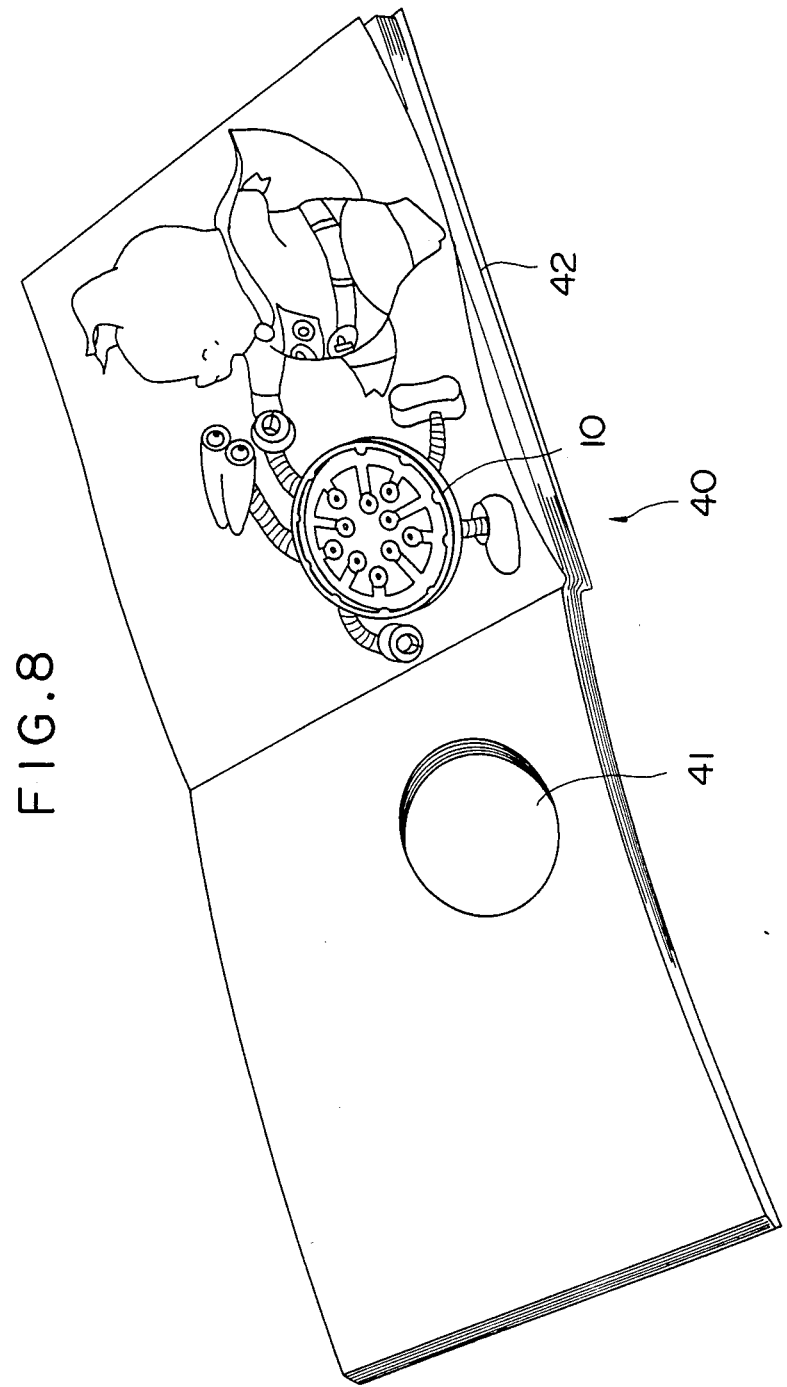
FIG. 8 shows a perspective view of the toy incorporated in a picture book.

Because of the flat and small configuration of the toy in accordance with the present invention, it may be easily incorporated in a picture book. As shown in FIG. 8, the underside of the toy 10 is secured on the inside surface of the back cover 42 of a picture book 40. Formed in leafs of the book are openings 41 of slightly larger diameter than that of the toy so that it is positioned within the openings 41 and is touchable by a finger on any page of the book. To make the book more enjoyable to children, all pages may include various pictures and printings of conversation. In the embodiment shown in this figure, a character is shown and simple questions are printed, for instance, "How many green pieces are there?" or "How many pieces are there totally in red and green?". In this way, a person can easily and pleasantly teach a child the name of colour, concept of number or calculation with the pieces variously moved.

As above-mentioned, since a plurality of slider pieces 31 are slidably and undetachably disposed between the guide plate 11 and the body 10, any child may easily play with the toy and enjoy simple calculation. Further, since the toy may be manufactured by plastic molding process into a flat and light-weight product, the toy can be easily incorporated in a picture book. Various colour combinations of slider pieces 31 are selectable for education on color sense.

The aforesaid embodiment of the present invention can be modified within the same technical scope. For example, the body, guide plate and slider pieces can be formed of substentially rectangular shape. The cutouts of the guide plate include various directions and configurations and may contain curved or bent passages or connected passages. The toy can be of course incorporated in an article such as a play board for little children.

What is claimed is:

1. An educational toy comprising a body having a peripheral vertical wall, a guide plate secured on said body and having a plurality of cutouts to be passages, a connecting passage formed between said vertical wall and said guide plate for communicating with said cutouts, a spacer disposed between said guide plate and said body, a plurality of slider pieces slidably and undetachably movable along said cutouts and said connecting passage and a plurality of inwardly extending lugs formed inside the peripheral vertical wall of the body to prevent detachment of said slider pieces.

2. An educational toy as defined in claim 1, each of said slider pieces includes a base disk slidable within said cutouts and within said connecting passage, and a protrusion extending above the guide plate.

3. An educational toy as defined in claim 2, wherein an upper surface of the base disk of each slider piece faces the underside of said guide plate.

4. An educational toy as defined in claim 1, said body and guide plate are of the circular shape.

5. An educational toy as defined in claim 1, wherein said slider pieces are the same number as the cutouts of said guide plate.

6. An educational toy as defined in claim 1, wherein said slider pieces are differently coloured.

7. An educational toy as defined in claim 1, wherein said toy is incorporated in a picture book which includes continuous leafs provided with aligned openings; the toy is secured to an inside surface of the back cover such that it is positioned within said openings.

8. An educational toy as defined in claim 1, said connecting passage communicates with said cutouts which extend radially and inwardly toward the center of said guide plate.

9. An educational toy comprising a body having a peripheral vertical wall, a guide plate secured on said body and having a plurality of cutouts to be passages, a connecting passage formed between said vertical wall and said guide plate for communicating with said cutouts, a spacer disposed between said guide plate and said body, said spacer is formed integrally with said guide plate or said body, said spacer having a plurality of forked portions which surround said openings formed at inner ends of said cutouts, and a plurality of slider pieces slidably and undetachably movable along said cutouts and said connecting passage.

* * * * *